US009304340B2

(12) United States Patent
Dai et al.

(10) Patent No.: US 9,304,340 B2
(45) Date of Patent: Apr. 5, 2016

(54) METHOD AND DEVICE FOR MEASURING FLICKER VALUE OF LIQUID CRYSTAL MODULES

(71) Applicant: Shenzhen China Star Optoelectronics Technology Co., Ltd., Shenzhen, Guangdong (CN)

(72) Inventors: Ye Dai, Shenzhen (CN); Chih-Tsung Kang, Shenzhen (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 174 days.

(21) Appl. No.: 14/234,625

(22) PCT Filed: Nov. 22, 2013

(86) PCT No.: PCT/CN2013/087668
§ 371 (c)(1),
(2) Date: Jan. 23, 2014

(87) PCT Pub. No.: WO2015/066946
PCT Pub. Date: May 14, 2015

(65) Prior Publication Data
US 2015/0129749 A1    May 14, 2015

(30) Foreign Application Priority Data

Nov. 8, 2013  (CN) .......................... 2013 1 0550178

(51) Int. Cl.
*G02F 1/13*  (2006.01)
*H04N 5/335*  (2011.01)
*H04N 5/378*  (2011.01)
*G09G 3/36*  (2006.01)

(52) U.S. Cl.
CPC ................. *G02F 1/1309* (2013.01); *G09G 3/36* (2013.01); *H04N 5/3355* (2013.01); *H04N 5/378* (2013.01); *G09G 2320/0247* (2013.01); *G09G 2320/0693* (2013.01); *G09G 2360/145* (2013.01); *G09G 2360/16* (2013.01)

(58) Field of Classification Search
CPC ........ G01N 11/00; G02F 1/1309; G09G 3/36; H04N 5/3355; H04N 5/378
See application file for complete search history.

(56) References Cited

PUBLICATIONS

International Search Report for PCT/CN2013/087668.*
Nam—KR Application No. 10-1996-0059945, Machine English Translation.*

* cited by examiner

*Primary Examiner* — Francis M Legasse, Jr.
(74) *Attorney, Agent, or Firm* — Andrew C. Cheng

(57) ABSTRACT

A method for measuring flicker value of a liquid crystal module and related device are proposed. The method includes: providing flicker images to a liquid crystal module; applying a measure unit to scan the liquid crystal module to convert luminance of the liquid crystal into voltage signals to obtain analog luminance signals of the liquid crystal module; receiving the analog luminance signals from the measure unit and converting the analog luminance signals of the measure unit into digital luminance signals; performing Fourier transformation of the digital luminance signals to obtain magnitude of specific frequency wave; obtaining flicker value of the liquid crystal module through the magnitude of specific frequency wave. By using the present invention, the common voltage signal applied on the liquid crystal module is adjusted based on the flicker value of the liquid crystal module measured in real time. Therefore quality of liquid crystal module products is raised.

17 Claims, 3 Drawing Sheets

METHOD AND DEVICE FOR MEASURING FLICKER VALUE OF LIQUID CRYSTAL MODULES

CROSS-REFERENCE TO RELATED APPLICATION

This application claims priority from and the benefit under 35 U.S.C. §119(a) of Chinese Patent Application No. 201310550178.9, filed on Nov. 8, 2013, which is hereby incorporated by reference for all purposes as if fully set forth herein.

BACKGROUND OF THE INVENTION

1. Field of Invention

The present invention relates to a measure technique for a Thin Film Transistor Liquid Crystal Display (TFT-LCD), more particularly, to a method and a device for measuring flicker of liquid crystal modules.

2. Description of the Prior Art

In the usage of liquid crystal panels, polarities switch of common voltage signals (Vcom) causes horizontal strip flickers, known as Flicker phenomena. Flicker value is a direct indicator of quality and reliability of liquid crystal panels. Generally, the lower the flicker value is, the fewer the risk of Image Sticking (IS) on liquid crystal panels is, and vice visa. Therefore, measuring flicker value and keeping flicker value within a preset range is an unavoidable challenge in designing and manufacturing liquid crystal panels.

Conventionally, to measure flicker value, methods such as FMA, JEITA and VESA are usually applied. These conventional methods are common in quantifying an observation of viewing flicker in terms of flicker values. FMA takes ratio of AC component to DC component of luminance variation as flicker values. JIETA and VESA apply Fast Fourier Converctation (FFT) to measure decibel value of every flicker frequency respectively, then integrate over the spectrum or locate the greatest decibel value. These methods can quantitatively analyze the observation of viewing flicker, however these methods does not directly represent Flicker phenomena caused by polarities switch of common voltage signals Vcom. Moreover, the measured flicker values may not correctly reflect a shift of common voltage signals Vcom due to other causes, such as a flicker of a backlight or unstable ground wire, etc.

SUMMARY OF THE INVENTION

It is therefore a primary object of the present invention to provide a method and a device of measuring flicker values of liquid crystal modules which achieves real-time measurement of flicker values of the liquid crystal modules in order to adjust common electrodes and raise quality of liquid crystal module products.

According to the present invention, a method for measuring flicker value of a liquid crystal module comprises:

providing flicker images to a liquid crystal module to be measured;

applying a measure unit to scan the liquid crystal module to convert luminance of the liquid crystal into voltage signals to obtain analog luminance signals of the liquid crystal module;

receiving the analog luminance signals from the measure unit and converting the analog luminance signals of the measure unit into digital luminance signals;

performing Fourier transformation of the digital luminance signals to obtain magnitude of specific frequency wave; and obtaining a flicker value of the liquid crystal module through the magnitude of specific frequency wave.

Preferably, the step of applying the measure unit to scan the liquid crystal module to convert luminance of the liquid crystal into voltage signals to obtain analog luminance signals of the liquid crystal module comprises:

applying one or more photo diodes to obtain luminance signals of the liquid crystal module;

applying an amplifying circuit to amplify the luminance signals;

averaging the at least one amplified luminance to obtain analog luminance signals of the liquid crystal module.

Preferably, the specific frequency is switch frequency of common voltage signals of the liquid crystal module.

Preferably, the step of obtaining a flicker value of the liquid crystal module through the magnitude of the specific frequency wave comprises:

calculating the flicker value of the liquid crystal module in a following formula:

$$Flic = 20 \times \text{Log}_{10} \frac{V@(30\,Hz/60\,Hz)}{V@(0\,Hz)}$$

wherein Flic is flicker value of the liquid crystal module, V@ (30 Hz/60 Hz) is magnitude of switch frequency wave of common voltage signals, and V@ (0 Hz) is average magnitude.

Preferably, the method further comprises:

sending parameter adjusting commands to the liquid crystal module according to calculated flicker value of the liquid crystal module to adjust parameters of common voltage signals of the liquid crystal module to ensure the flicker value of the liquid crystal module comply with a predetermined value.

According to the present invention, a method for measuring flicker value of a liquid crystal module comprises:

providing flicker images to a liquid crystal module to be measured;

applying a measure unit to scan the liquid crystal module to convert luminance of the liquid crystal into voltage signals to obtain analog luminance signals of the liquid crystal module;

receiving the analog luminance signals from the measure unit and converting the analog luminance signals of the measure unit into digital luminance signals;

performing Fourier transformation of the digital luminance signals to obtain magnitude of specific frequency wave;

obtaining flicker value of the liquid crystal module through the magnitude of the specific frequency wave, and calculating flicker value of the liquid crystal module in a following formula:

$$Flic = 20 \times \text{Log}_{10} \frac{V@(30\,Hz/60\,Hz)}{V@(0\,Hz)}$$

wherein Flic is flicker value of the liquid crystal module, V@ (30 Hz/60 Hz) is magnitude of switch frequency wave of common voltage signals, and V@ (0 Hz) is average magnitude.

Preferably, the step of applying the measure unit to scan the liquid crystal module to convert luminance of the liquid crystal into voltage signals to obtain analog luminance signals of the liquid crystal module comprises:

applying one or more photo diodes to obtain luminance signals of the liquid crystal module;

applying an amplifying circuit to amplify the luminance signals;

averaging the at least one amplified luminance to obtain analog luminance signals of the liquid crystal module.

Preferably, the specific frequency is switch frequency of common voltage signals of the liquid crystal module.

Preferably, the method further comprises:

sending parameter adjusting commands to the liquid crystal module according to calculated flicker value of the liquid crystal module to adjust parameters of common voltage signals of the liquid crystal module to ensure the flicker value of the liquid crystal module comply with a predetermined value.

According to the present invention, a device for measuring flicker value of a liquid crystal module comprises:

a measure unit for scanning a liquid crystal module to be measured with flicker images to convert luminance of the liquid crystal module into voltage signals to obtain analog luminance signals of the liquid crystal module;

an analog-to-digital converting device for receiving analog luminance signals from the measure unit and converting the analog luminance signals into digital luminance signals;

a Fourier transformation device for performing Fourier transformation of the digital luminance signals to obtain magnitude of specific frequency wave;

a calculating device for calculating flicker value of the liquid crystal module according to magnitude of specific frequency wave obtained by the Fourier transformation device.

Preferably, the measure unit further comprises:

one or more photo diodes for obtaining luminance signal of the liquid crystal module;

an amplifying circuit, coupled to the one or more photo diodes, for amplifying the luminance signals obtained by the one or more photo diodes;

a measure sub-unit for averaging the at least one amplified luminance signal to obtain analog luminance signals of the liquid crystal module.

Preferably, the specific frequency is switch frequency of common voltage signals of the liquid crystal module.

Preferably, the measure processing device calculates flicker value of the liquid crystal module by the following formula:

$$Flic = 20 \times \text{Log}_{10} \frac{V@(30\,Hz/60\,Hz)}{V@(0\,Hz)}$$

wherein Flic is flicker value of the liquid crystal module, V@ (30 Hz/60 Hz) is magnitude of switch frequency wave of common voltage signals, and V@ (0 Hz) is average magnitude.

Preferably, the device further comprises:

a flicker images providing device for providing flicker images to the liquid crystal module; and a parameter adjusting device for sending parameter adjusting commands to the liquid crystal module according to the calculated flicker value of the liquid crystal module to adjust parameters of common voltage signals of the liquid crystal module to ensure flicker value of the liquid crystal module comply with a predetermined value.

The preferred embodiment of the present invention has advantages as follows:

According to the embodiment of the present invention, when flicker images are displayed on liquid crystal modules, scanning luminance signals are capable of obtaining magnitude of a specific frequency wave (frequency of switch of common voltage signals Vcom) through Fourier transformation device, and obtain flicker value through a given formula. The embodiment of the present invention measures Flicker phenomena caused by polarities switch of common voltage signals Vcom precisely. According to obtained flicker value in measurement, common electrodes are more precisely adjusted in the liquid crystal modules, therefore quality of liquid crystal module products is raised.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF THE PREFERRED EMBODIMENT

The present invention is described in detail in conjunction with the accompanying drawings and embodiments.

Figure 1:
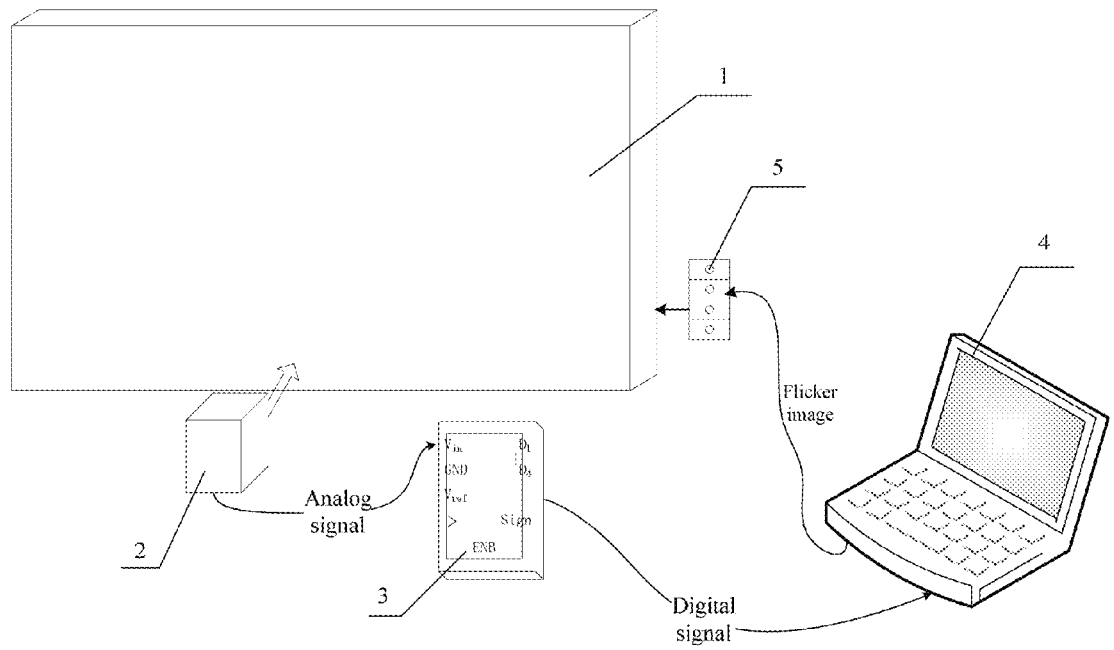
FIG. 1 shows a schematic diagram of a device for measuring flicker value of a liquid crystal module according to a preferred embodiment of the present embodiment.
Figure 2:
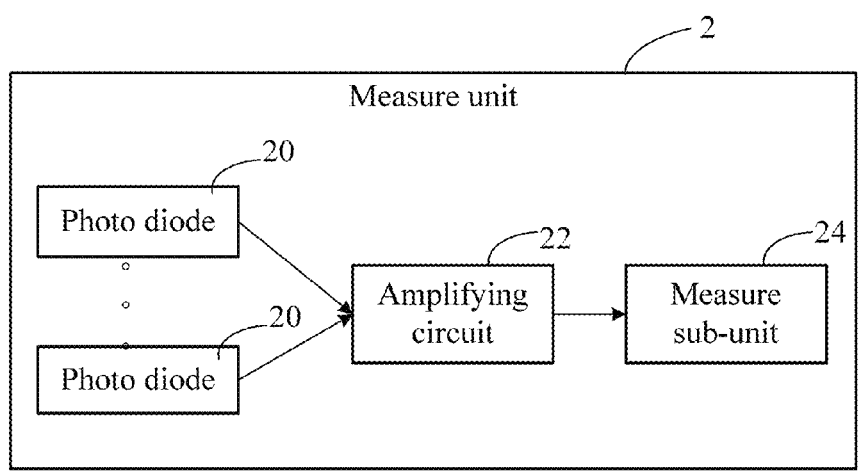
FIG. 2 shows a block diagram of a measure unit shown in FIG. 1.
Figure 3:
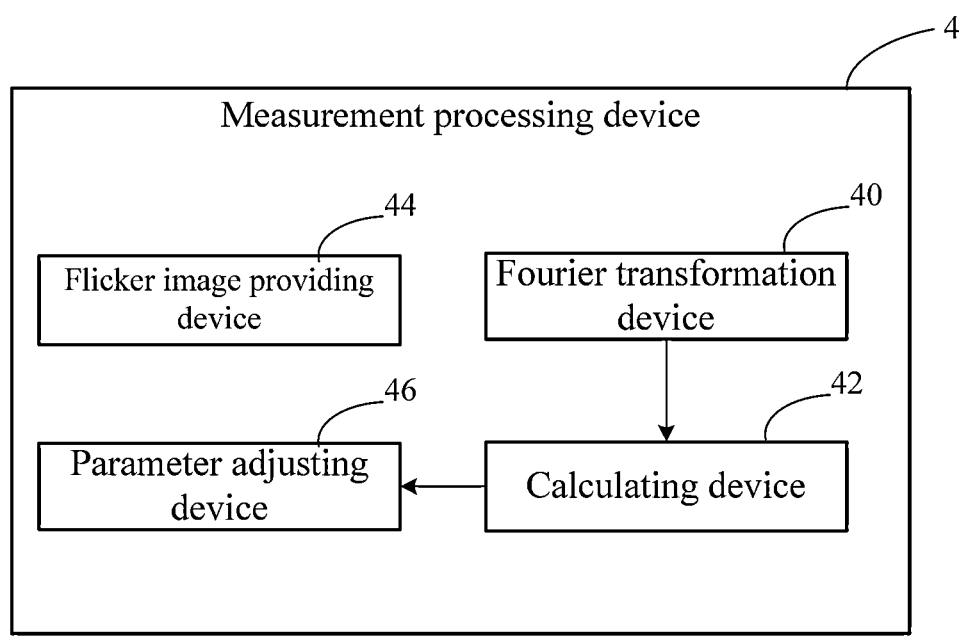
FIG. 3 shows a block diagram of a measure processing device shown in FIG. 1.

Please refer to FIGS. 1-3, FIGS. 1-3 are diagrams of the structure of a device for measuring flicker value of liquid crystal modules according to a preferred embodiment of the present embodiment. The device for measuring flicker value of liquid crystal modules comprises:

a measure unit 2 which scans a liquid crystal module 1 to be measured with flicker images and converts luminance of the liquid crystal module 1 into voltage signals to obtain analog luminance signals;

an analog-to-digital converting device 3 which receives analog luminance signals from the measure unit 2 and converts analog luminance signals into digital luminance signals;

a measurement processing device 4 which provides flicker images to the liquid crystal module 1 and obtains flicker value of the liquid crystal module 1 by calculating digital luminance signals output from the analog-to-digital converting device 3.

The measurement processing device 4 is connected to the liquid crystal module 1 through a printed circuit board assembly (PCBA) 5, provides flicker images to the liquid crystal module 1, and sends control demands; whereas the liquid crystal module 1 blinks when receiving flicker images, while a measure unit 1 collects analog luminance signals of the liquid crystal module 1.

FIG. 2 indicates a block diagram of the measure unit 1 according to an embodiment of the present invention. In the embodiment, the measure unit 2 comprises:

one or more photo diodes 20 which collect luminance signals of the liquid crystal module 1, such as collecting luminance signals of the liquid crystal module 1 by scanning, and the collected luminance signals are analog signals, hereinafter referred to as analog luminance signals. More particularly, either one or a plurality of photo diodes can be applied, and applying a plurality of photo diodes improve accuracy of data collected. The photo diode may be photo diode S9219 of Hamamatsu corporation;

an amplifying circuit 22 coupled to one or more photo diodes 20, which amplifies luminance signals obtained by one or more photo diodes 22;

a measure sub-unit 24 electrically connected to the amplifying circuit 22, which averages at least one amplified luminance signal to obtain analog luminance signals of the liquid crystal module 1.

Understandably, in other embodiments, the measure unit 1 is capable of applying just one photo diode 20, therefore the measure sub-unit 24 is spared, and analog luminance signals are output after being amplified by the amplifying circuit 22.

FIG. 3 indicates a block diagram of a measurement processing device 4 according to a preferred embodiment of the present invention. In the embodiment, the measurement processing device 4 comprises:

a Fourier transformation device 40 which performs Fourier transformation of digital luminance signals and obtains magnitude of specific frequency waves. More particularly, the Fourier transformation device 40 performs Fourier transformation of digital luminance signals to obtain frequency domain, i.e. width of frequency waves, whereas specific frequency indicates switch frequency of current common voltage signal (Vcom) applied on the liquid crystal module, generally 30 Hz or 60 Hz.

a calculating device 42 which obtains magnitude of the specific frequency wave according to the Fourier transformation device 40 and calculates obtained flicker value of the liquid crystal module 1. The measurement processing device 42 calculates flicker value of the liquid crystal module 1 through the following formula:

$$Flic = 20 \times \text{Log}_{10} \frac{V@(30\,Hz/60\,Hz)}{V@(0\,Hz)}$$

where Flic is flicker value of liquid crystal modules, V@ (30 Hz/60 Hz) is magnitude of switch frequency waves of current Vcom, i.e. magnitude of 30 Hz or 60 Hz waves, and V@ (0 Hz) is average value.

A parameter adjusting device 46 sends parameter adjusting commands to liquid crystal modules according to calculated flicker value of the liquid crystal module 1 to adjust parameters of common voltage signals Vcom of the liquid crystal module 1, so that flicker value of the liquid crystal module 1 complies with predetermined value.

A flicker image providing device 44 provides flicker images to the liquid crystal module 1, and enables the liquid crystal module 1 to blink.

Figure 4:
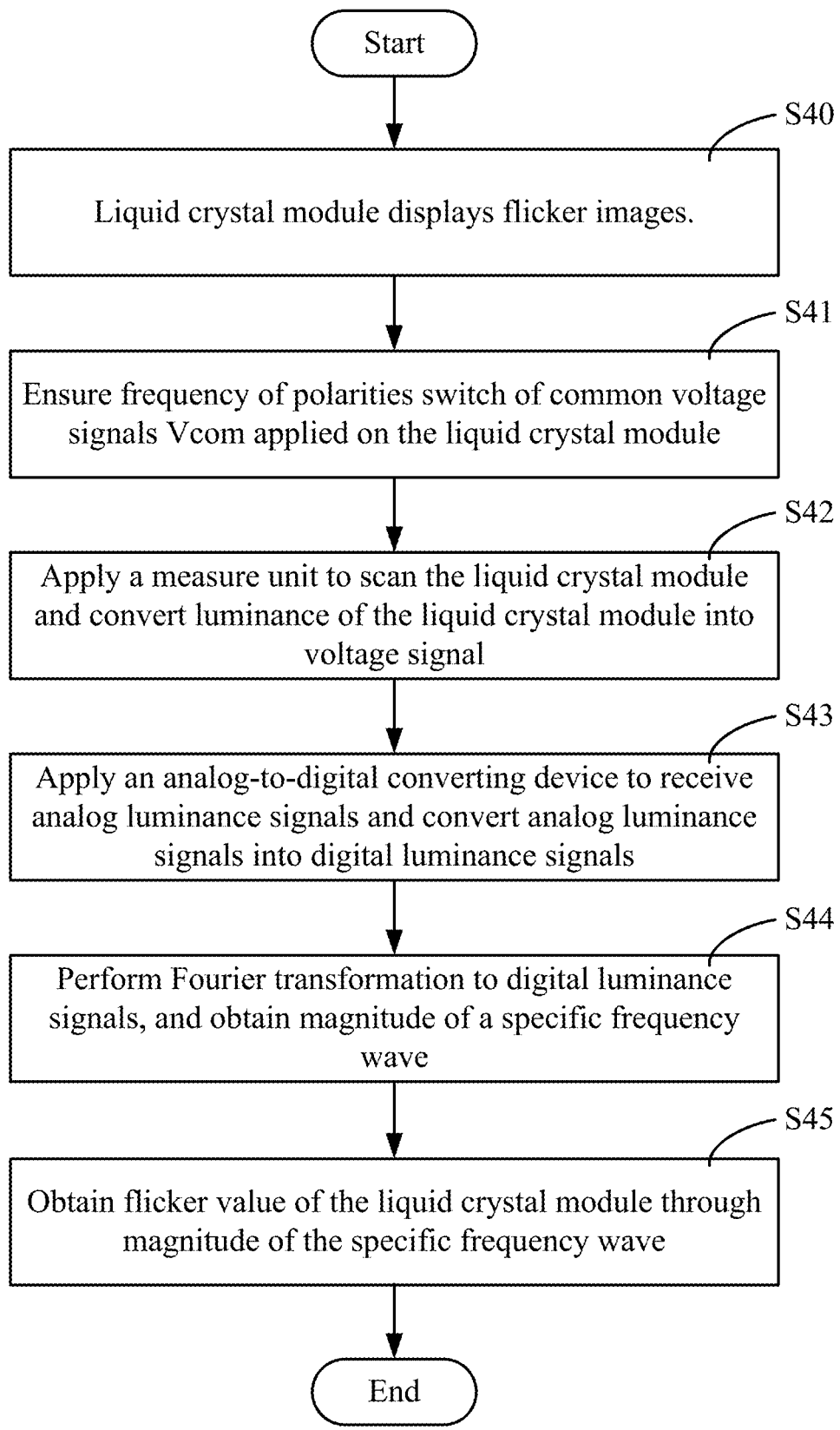
FIG. 4 shows a flowchart of a method of measuring flicker value of a liquid crystal module according to another preferred embodiment of the present embodiment.

FIG. 4 shows a flowchart of a method of measuring flicker value of a liquid crystal module according to another preferred embodiment of the present embodiment. The method comprises:

Step S40: providing flicker images to the liquid crystal module to be measured, enabling the liquid crystal module to display these flicker images, making these flicker images blink;

Step S41: ensuring frequency of polarities switch of common voltage signals Vcom applied on the liquid crystal module, in general, frequency of polarities switch of common voltage signals Vcom applied on the liquid crystal module is 30 Hz or 60 Hz;

Step S42: applying a measure unit to scan the liquid crystal module and converting luminance of the liquid crystal module into voltage signals, obtaining analog luminance signals of the liquid crystal module;

Step S43: applying an analog-to-digital converting device to receive analog luminance signals from the measuring unit and converting analog luminance signals into digital luminance signals;

Step S44: performing Fourier transformation to digital luminance signals, and obtaining magnitude of a specific frequency wave, more particularly, performing Fourier transformation to digital luminance signals and obtaining frequency domain, i.e. width of frequency waves, where the specific frequency wave is frequency of switch of common voltage signals Vcom;

Step S46: obtaining flicker value of the liquid crystal module through magnitude of the specific frequency wave, more particularly, obtaining flicker value of the liquid crystal module 1 through the measuring processing device 42 by the following formula:

$$Flic = 20 \times \text{Log}_{10} \frac{V@(30\,Hz/60\,Hz)}{V@(0\,Hz)},$$

where Flic is flicker value of the liquid crystal module, V@ (30 Hz/60 Hz) is magnitude of switch frequency waves of common voltage signals Vcom, i.e. magnitude of 30 Hz or 60 Hz, and V@ (0 Hz) is average value.

The method further comprises the following steps:

sending parameter adjusting commands to the liquid crystal module according to flicker value calculated of the liquid crystal module, and adjusting parameters of common voltage signals Vcom of the liquid crystal module (such as adjusting voltage value of the common voltage signals Vcom or adjusting inputting from DC terminal or AC terminal), to ensure flicker value of the liquid crystal module comply with predetermined value.

More particularly, a measure unit is applied to scan the liquid crystal module and convert luminance of the liquid crystal module into voltage signals, in order to obtain analog luminance signals. The following steps are:

applying at least a photo diode to obtain luminance signals of the liquid crystal module, for instance, applying more than two photo diodes to collect luminance signals of the liquid crystal modules;

applying an amplifying circuit to amplify luminance signals;

averaging at least one amplified luminance to obtain analog luminance signals, understandably, if applying only one photo diode in the measure unit, skipping this averaging step.

The benefits of the embodiment according to the present invention are:

In sum, according to the embodiment of the present invention, when flicker images are displayed on liquid crystal modules, scanning luminance signals is capable of obtaining magnitude of the specific frequency wave (frequency of switch of Vcom) through Fourier transformation device, and obtaining flicker value through a given formula. The embodiment of the present invention is capable of measuring Flicker phenomena caused by polarities switch of common Vcom precisely. According to obtained flicker value in measurement, common electrodes are more precisely adjusted in liquid crystal modules producing, therefore quality of liquid crystal module products is raised.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for measuring flicker value of a liquid crystal module comprising:
   providing flicker images to a liquid crystal module to be measured;
   applying a measure unit to scan the liquid crystal module to convert luminance of the liquid crystal into voltage signals to obtain analog luminance signals of the liquid crystal module;
   receiving the analog luminance signals from the measure unit and converting the analog luminance signals of the measure unit into digital luminance signals;
   performing Fourier transformation of the digital luminance signals to obtain magnitude of specific frequency wave; and
   obtaining a flicker value of the liquid crystal module through the magnitude of specific frequency wave.

2. The method of claim 1, wherein the step of applying the measure unit to scan the liquid crystal module to convert luminance of the liquid crystal into voltage signals to obtain analog luminance signals of the liquid crystal module comprises:
   applying one or more photo diodes to obtain luminance signals of the liquid crystal module;
   applying an amplifying circuit to amplify the luminance signals;
   averaging the at least one amplified luminance to obtain analog luminance signals of the liquid crystal module.

3. The method of claim 1, wherein the specific frequency is switch frequency of common voltage signals of the liquid crystal module.

4. The method of claim 1, wherein the step of obtaining a flicker value of the liquid crystal module through the magnitude of the specific frequency wave comprises:
   calculating the flicker value of the liquid crystal module in a following formula:

$$Flic = 20 \times \text{Log}_{10} \frac{V@(30\,Hz/60\,Hz)}{V@(0\,Hz)}$$

wherein Flic is flicker value of the liquid crystal module, V@ (30 Hz/60 Hz) is magnitude of switch frequency wave of common voltage signals, and V@ (0 Hz) is average magnitude.

5. The method of claim 2, further comprising:
   sending parameter adjusting commands to the liquid crystal module according to calculated flicker value of the liquid crystal module to adjust parameters of common voltage signals of the liquid crystal module to ensure the flicker value of the liquid crystal module comply with a predetermined value.

6. The method of claim 4, further comprising:
   sending parameter adjusting commands to the liquid crystal module according to calculated flicker value of the liquid crystal module to adjust parameters of common voltage signals of the liquid crystal module to ensure the flicker value of the liquid crystal module comply with a predetermined value.

7. A method for measuring flicker value of a liquid crystal module comprising:
   providing flicker images to a liquid crystal module to be measured;
   applying a measure unit to scan the liquid crystal module to convert luminance of the liquid crystal into voltage signals to obtain analog luminance signals of the liquid crystal module;
   receiving the analog luminance signals from the measure unit and converting the analog luminance signals of the measure unit into digital luminance signals;
   performing Fourier transformation of the digital luminance signals to obtain magnitude of specific frequency wave;
   obtaining flicker value of the liquid crystal module through the magnitude of the specific frequency wave, and calculating flicker value of the liquid crystal module in a following formula:

$$Flic = 20 \times \text{Log}_{10} \frac{V@(30\,Hz/60\,Hz)}{V@(0\,Hz)}$$

wherein Flic is flicker value of the liquid crystal module, V@ (30 Hz/60 Hz) is magnitude of switch frequency wave of common voltage signals, and V@ (0 Hz) is average magnitude.

8. The method of claim 7, wherein the step of applying the measure unit to scan the liquid crystal module to convert luminance of the liquid crystal into voltage signals to obtain analog luminance signals of the liquid crystal module comprises:
   applying one or more photo diodes to obtain luminance signals of the liquid crystal module;
   applying an amplifying circuit to amplify the luminance signals;
   averaging the at least one amplified luminance to obtain analog luminance signals of the liquid crystal module.

9. The method of claim 8, wherein the specific frequency is switch frequency of common voltage signals of the liquid crystal module.

10. The method of claim 7, further comprising:
    sending parameter adjusting commands to the liquid crystal module according to calculated flicker value of the liquid crystal module to adjust parameters of common voltage signals of the liquid crystal module to ensure the flicker value of the liquid crystal module comply with a predetermined value.

11. The method of claim 9, further comprising:
    sending parameter adjusting commands to the liquid crystal module according to calculated flicker value of the liquid crystal module to adjust parameters of common voltage signals of the liquid crystal module to ensure the flicker value of the liquid crystal module comply with a predetermined value.

12. A device for measuring flicker value of a liquid crystal module comprising:
    a measure unit for scanning a liquid crystal module to be measured with flicker images to convert luminance of the liquid crystal module into voltage signals to obtain analog luminance signals of the liquid crystal module;
    an analog-to-digital converting device for receiving analog luminance signals from the measure unit and converting the analog luminance signals into digital luminance signals;
    a Fourier transformation device for performing Fourier transformation of the digital luminance signals to obtain magnitude of specific frequency wave;
    a calculating device for calculating flicker value of the liquid crystal module according to magnitude of specific frequency wave obtained by the Fourier transformation device.

13. The device of claim 12, wherein the measure unit further comprises:
one or more photo diodes for obtaining luminance signal of the liquid crystal module;
an amplifying circuit, coupled to the one or more photo diodes, for amplifying the luminance signals obtained by the one or more photo diodes;
a measure sub-unit for averaging the at least one amplified luminance signal to obtain analog luminance signals of the liquid crystal module.

14. The device of claim 13, wherein the specific frequency is switch frequency of common voltage signals of the liquid crystal module.

15. The device of claim 14, wherein the measure processing device calculates flicker value of the liquid crystal module by the following formula:

$$Flic = 20 \times \text{Log}_{10} \frac{V@(30\,Hz/60\,Hz)}{V@(0\,Hz)}$$

wherein Flic is flicker value of the liquid crystal module, V@ (30 Hz/60 Hz) is magnitude of switch frequency wave of common voltage signals, and V@ (0 Hz) is average magnitude.

16. The device of claim 13 further comprising:
a flicker images providing device for providing flicker images to the liquid crystal module; and
a parameter adjusting device for sending parameter adjusting commands to the liquid crystal module according to the calculated flicker value of the liquid crystal module to adjust parameters of common voltage signals of the liquid crystal module to ensure flicker value of the liquid crystal module comply with a predetermined value.

17. The device of claim 15 further comprising:
a flicker images providing device for providing flicker images to the liquid crystal module; and
a parameter adjusting device for sending parameter adjusting commands to the liquid crystal module according to the calculated flicker value of the liquid crystal module to adjust parameters of common voltage signals of the liquid crystal module to ensure flicker value of the liquid crystal module comply with a predetermined value.

* * * * *